G. E. STANSBURY AND R. HARPER.
SUPPORT.
APPLICATION FILED FEB. 24, 1920.
1,381,761.
Patented June 14, 1921.
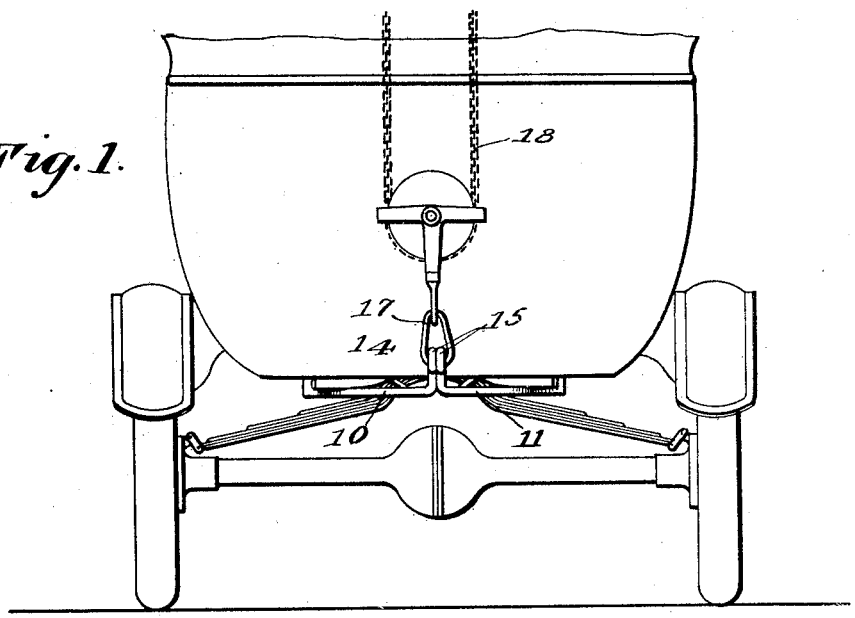
Fig. 1.
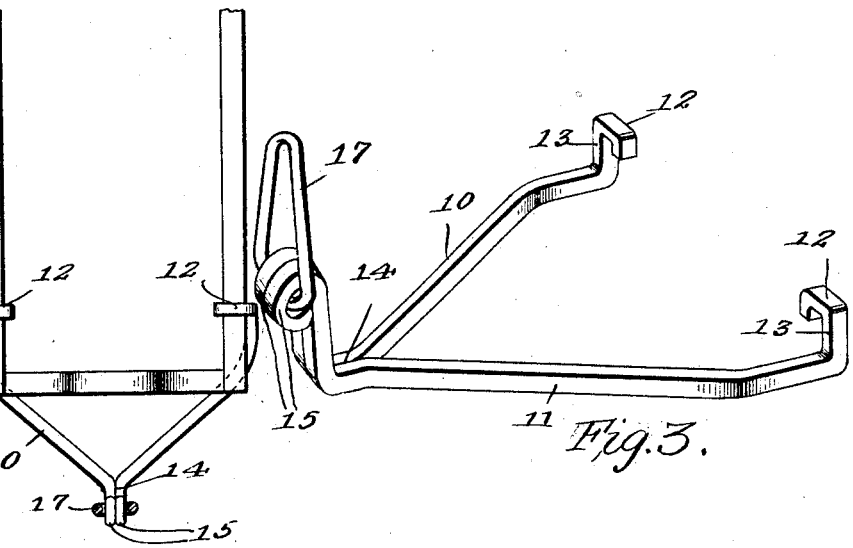
Fig. 2.
Fig. 3.
G. E. Stansbury
R. Harper
INVENTOR
BY Victor J. Evans
ATTORNEY
R. A. Thomas
Edward Yeager
WITNESSES

UNITED STATES PATENT OFFICE.

GEORGE EDWARD STANSBURY AND RAYMOND HARPER, OF CATLIN, ILLINOIS, ASSIGNORS OF ONE-HALF TO H. C. SHOCKLEY, OF DANVILLE, ILLINOIS.

SUPPORT.

1,381,761.   Specification of Letters Patent.   Patented June 14, 1921.

Application filed February 24, 1920. Serial No. 360,559.

*To all whom it may concern:*

Be it known that we, GEORGE E. STANSBURY and RAYMOND HARPER, citizens of the United States, residing at Catlin, in the county of Vermilion and State of Illinois, have invented new and useful Improvements in Supports, of which the following is a specification.

This invention comprehends the provision of a device for supporting the rear end of an automobile in elevation for the purpose of repairs, the invention being susceptible of use in conjunction with a device for hoisting chains and cables.

It is the purpose of this invention to provide a device for this purpose, designed to be readily and quickly associated with the chassis of the car, the construction being such as to eliminate any possibility of the device being casually separated or slipping with relation to the frame while the car is elevated.

The nature and advantages of the invention will be better understood when the following detail description is taken in connection with the accompanying drawings the invention residing in the construction combination and arrangement of parts as claimed.

In the drawings forming part of this specification like numerals of reference indicate similar parts in the several views and wherein:—

Figure 1 is an elevation of an automobile showing the device associated therewith.

Fig. 2 is a fragmentary plan view of the chassis of a car showing the hook associated therewith.

Fig. 3 is a perspective view of the clamping device.

The device forming the subject matter of our invention is clearly illustrated in Fig. 3 and is in the nature of a yoke made up of two members 10 and 11 respectively. These members are identical in construction, and have corresponding extremities terminating to provide upwardly and inwardly directed hooks 12. The shank of the hook is indicated at 13 and extends upwardly from each member, while the bill of the hook projects horizontally from the shank as shown. The opposite corresponding extremities of the members 10 and 11 are brought to lie in contacting engagement as at 14, and then are extended upwardly in parallelism to provide loops or eyes 15. The members 10 and 11 respectively are connected together by means of a link 17 passed through the eyes 15 as shown. The device is adapted to be used in connection with a hoisting chain and pulley as shown in Fig. 1. In practice, if it is desired to elevate the rear end of an automobile for the purpose of repairs or the like, the yoke is associated with the frame or chassis of the car as shown. The yoke is arranged horizontally, to lie in a plane between the rear spring and the frame or chassis of the car, the hooks 14 engaging the opposite side members of the chassis as shown. The hook or eye carried by the hoisting pulley, is then associated with the link 17. The hoisting chain 18 is then utilized to elevate the rear end of the vehicle, the chain being secured to the side of the vehicle in any suitable manner to hold the rear end elevated. The yoke or clamping device is extremely simple in construction, and is designed to be readily and easily associated with the frame or chassis of the car. The construction is such that when the yoke is applied to the frame of the vehicle for use, it can not slip relative to the frame or become separated therefrom in any way while the vehicle is being elevated or subsequent to being elevated. The clamp or yoke can be carried in the tool box of the car, and can be used in any place where hoisting pulley and chain may be found.

While it is believed that from the foregoing description the nature and advantages of the invention will be readily apparent, we desire to have it understood that we do not limit ourselves in this connection and that such changes may be resorted to when desired as fall within the scope of what is claimed.

Having thus described our invention what we claim as new is:—

1. Means for elevating the rear end of a motor vehicle comprising two independently movable members divergently disposed and having their adjacent terminals in contacting engagement, a link associated with said terminals, said members being arranged to engage the under side of the chassis of the car adjacent the corners thereof, and hook like portions formed by the other ends of said members and adapted to overlie the upper portion of the opposed side members of the chassis as described.

2. Means for elevating the rear end of a motor vehicle, comprising two relatively movable members divergently disposed, the adjacent corresponding terminals of said members being arranged at right-angles thereto and disposed in face to face contact, said terminals forming loops, a link associated with said loops, said members adjacent their opposite ends being bent to provide parallel portions and upwardly and inwardly directed hooks adapted to engage over the opposed sides of the chassis with the said members bearing against the under surface thereof for the purpose specified.

In testimony whereof we affix our signatures.

GEORGE EDWARD STANSBURY.
RAYMOND HARPER.